(12) United States Patent
Buron et al.

(10) Patent No.: US 6,443,145 B1
(45) Date of Patent: Sep. 3, 2002

(54) SOLAR SEEKER

(75) Inventors: Victor Buron; Harry R. Beaupre, both of Wellington, NV (US)

(73) Assignee: Learning Legacy, Wellington, NV (US)

( * ) Notice: Subject to any disclaimer, the term of this patent is extended or adjusted under 35 U.S.C. 154(b) by 0 days.

(21) Appl. No.: 09/935,628

(22) Filed: Aug. 24, 2001

Related U.S. Application Data

(60) Provisional application No. 60/227,652, filed on Aug. 25, 2000.

(51) Int. Cl.[7] .................................................. F24J 2/38
(52) U.S. Cl. ........................ 126/601; 126/604; 126/607; 136/244
(58) Field of Search ................................ 126/600–608, 126/696; 136/246, 244; 353/3; 250/203.4, 491.1

(56) References Cited

U.S. PATENT DOCUMENTS

| | | | |
|---|---|---|---|
| 4,145,021 A | | 3/1979 | Gaechter et al. |
| 4,205,661 A | * | 6/1980 | Chapman .................... 126/607 |
| 4,295,621 A | | 10/1981 | Siryj |
| 4,332,238 A | | 6/1982 | Garcia, Jr. |
| 4,334,521 A | * | 6/1982 | Jacoby ........................ 126/605 |
| D271,129 S | | 10/1983 | Demmer |
| 4,408,595 A | | 10/1983 | Broyles et al. |
| 4,457,297 A | * | 7/1984 | Sobczak et al. ............. 126/605 |
| 4,491,388 A | | 1/1985 | Wood |
| 4,980,697 A | | 12/1990 | Eklund |
| 4,995,377 A | * | 2/1991 | Eiden ........................ 126/605 |
| 6,067,982 A | | 5/2000 | Harrison |

FOREIGN PATENT DOCUMENTS

| | | |
|---|---|---|
| DE | 28 35 348 A1 | 2/1980 |
| FR | 82 205 463 | 11/1982 |
| FR | 2 539 852 | 7/1984 |
| FR | 2 623 275 | 5/1989 |

* cited by examiner

*Primary Examiner*—James C. Yeung
(74) *Attorney, Agent, or Firm*—Richard C. Litman

(57) ABSTRACT

A solar seeker that automatically or manually tracks the sun for a maximum daily intake of solar energy to supply a predetermined amount of direct current electricity for various applications. The solar seeker includes a solar panel carriage assembly, a mounting assembly, and a travel assembly.

2 Claims, 18 Drawing Sheets

ELECTRICAL WIRING SYSTEM

SOLAR SEEKER

CROSS-REFERENCE TO RELATED APPLICATION

This application claims the benefit of U.S. Provisional Patent Application Ser. No. 60/227,652, filed Aug. 25, 2000.

BACKGROUND OF THE INVENTION

1. Field of the Invention

The present invention relates generally to tracking devices. More specifically, the invention is a solar tracking device which automatically or manually tracks the sun for a maximum daily intake of solar energy.

2. Description of Related Art

The related art is represented by the following patents of interest.

U.S. Design Pat. No. 271,129, issued on Oct. 25, 1983 to John Demmer, shows an ornamental design for a solar collector for a swimming pool. Demmer does not suggest a solar seeker according to the claimed invention.

U.S. Pat. No. 4,145,021, issued on Mar. 20, 1979 to Jean-Pierre Gaechter et al., describes an altazimuth orientation support for a panel for adjusting the panel in elevation and in lazimuth. Gaechter et al. do not suggest a solar seeker according to the claimed invention.

U.S. Pat. No. 4,295,621, issued on Oct. 20, 1981 to Bohdan W. Siryj, describes a solar tracking apparatus including a solar array support member which is pivotally secured to the upper end of a support post for rotation about a horizontal axis, wherein the support post is driven about a vertical axis. Siryj does not suggest a solar seeker according to the claimed invention.

U.S. Pat. No. 4,332,238, issued on Jun. 1, 1982 to Raul Garcia, Jr., describes a solar tracking subsystem which includes a first heat sensor means which is mounted adjacent a solar energy absorber of a solar collector system in a laterally offset position which lies in the movement path of the radiation focal point produced by a parabolic reflector, with that movement path being the normal result of the sun's apparent azimuthal movement in its diurnal path. Garcia, Jr. does not suggest a solar seeker according to the claimed invention.

U.S. Pat. No. 4,408,895, issued on Oct. 11, 1983 to Howard F. Broyles et al., describes a solar energy concentrator/collector assembly employing an altitude-azimuth dual scanning mounting assembly including a base with a circular track for mounting the assembly for rotation about a vertical axis. Broyles et al. do not suggest a solar seeker according to the claimed invention.

U.S. Pat. No. 4,457,297, issued on Jul. 3, 1984 to Isidore F. Sobczak et al., describes a modular solar radiation concentrator including a reflector and an azimuth/elevation mount. Sobczak et al. do not suggest a solar seeker according to the claimed invention.

U.S. Pat. No. 4,491,388, issued on Jan. 1, 1985 to Douglas E. Wood, describes a support system for a solar dish concentrator, the support system providing a sun tracking capability for the concentrator, both in the azimuth direction and in the altitude direction. Wood does not suggest a solar seeker according to the claimed invention.

U.S. Pat. No. 4,980,697, issued on Dec. 25, 1990 to Tore Eklund, describes an adjustable parabolic aerial support which permits stable attachment and easy positioning of parabolic aerials. Eklund does not suggest a solar seeker according to the claimed invention.

U.S. Pat. No. 6,067,982, issued on May 30, 2000 to John Harrison, describes an apparatus and methods for collecting and concentrating solar radiation for the generation of electrical power. Harrison does not suggest a solar seeker according to the claimed invention.

France Patent document 2,505,463, published on Nov. 12, 1982, describes a continuous tracking device for solar collector panels. France '463 does not suggest a solar seeker according to the claimed invention.

France Patent document 2,539,852, published on Jul. 27, 1984, describes a rotating and directional solar collector. France '852 does not suggest a solar seeker according to the claimed invention.

France Patent document 2,623,275, published on May 19, 1989, describes a solar heater unit which has an elliptical array of mirrors focused on a boiler and mounted on a turntable with elliptical motion. France '275 does not suggest a solar seeker according to the claimed invention.

Germany Patent document 2,835,348 A1, published on Feb. 14, 1980, describes a swivelling tracking reflector for solar energy collection which revolves the solar energy collector to face the ground for collector surface protection. Germany '348 does not suggest a solar seeker according to the claimed invention.

None of the above inventions and patents, taken either singly or in combination, is seen to describe the instant invention as claimed.

SUMMARY OF THE INVENTION

The present invention is a solar seeker that automatically or manually tracks the sun for a maximum daily intake of solar energy to supply a predetermined amount of direct current electricity for various applications. The solar seeker includes a solar panel carriage assembly, a mounting assembly, and a travel assembly. The solar panel carriage assembly includes a solar panel carriage with side supports, a bottom support, a center support, a down rest arm, and a top support. The solar panel carriage may be configured for a variety of sized solar panels, with a maximum of three panels of approximate size of twenty-six inches by fifty-nine inches. It is important that any combination of panels have a minimum of three inches open space or a maximum of nine inches of open space between panels. Such a solar panel typically includes a reflector plate which can be made of stainless steel, chromium plate, or the like but is generally made of a plastic, steel, or wood base, with a reflection surface laminated thereto. The reflection surface includes an energy absorbing surface lamination or equivalent photo electrical panel array for deriving energy from the solar panel.

The solar panel carriage is mounted on a carriage pivot that is attached to a top plate of the mounting assembly. The mounting assembly includes the top plate which functions as a weather guard for the entire solar seeker. The top plate has a top cover ring welded to it's underside to which side covers are secured. The top plate is bolted to a ram screw assembly which is a box configuration within which are included a ram screw, an up limit switch, a down limit switch, a lift limit rod, and a reversible lift motor. Both limit switches are triggered by the lift limit rod. At the end of the ram screw a U joint is attached, and attached to the U joint by a long coupling is a lift rod, and the end is a top pivot connector that attaches to the solar panel carriage. In the base of the ram screw assembly is a rotate motor mount and a low panel protection switch that is controlled by the lift limit rod.

The mounting assembly includes a generally circular base plate which may be mounted on any surface but must be level for normal operation, and must be level when travelling. Mounted on the base plate is a bottom weather ring, a main post, a buss bar, a first timing plate, travel switches, and a reversible rotation box. On the reversible rotation motor box is attached a timing switch trigger and a limit switch trigger. The reversible rotation motor box includes contained therein a rotate motor upon which is attached a drive sprocket which is attached by a bicycle type chain to a stationary rotation sprocket. Also on the rotation motor box is mounted the array return limit switch which is triggered by an array return timing plate. Attached to the main post is a stationary pivot sprocket, the array return timing plate described above, and a second timing plate. The array return timing plate turns freely and is positioned directly below the second timing plate. Attached to the second timing plate is a first limit trigger switch, a second limit trigger switch, and a ball bearing plate. Mounted on top of the second timing plate is a first rotation advance post. A second rotation post is inserted within the main post with a shim. On the interior of the second rotation post is a tension post and a bearing, and a tension nut for tension adjustment. A tension post and bearing are greased and placed inside the second rotation post and the tension nut (internal) is screwed down on the main bolt and tension is adjusted. A dust gasket is placed on a third timing plate and the first rotation post is inserted with a shim into the second rotation post. A bearing is greased and placed over the main bolt and the main bolt tension nut is adjusted. The third timing plate includes attached thereto a first limit switch trigger, a second limit switch trigger, and a ball bearing plate. The bottom of the ram screw assembly includes four rotation limit switches. The solar panel carriage assembly is configured to be shipped as a break-down unit that can be sized for any solar panel, and can be bolted together and bolted to nuts that are welded in place to the solar panel carriage assembly.

The travel carriage is a V-shaped support that is attached in the appropriate place to the main mounting stem that hosts the down rest arm that is attached to the solar panel carriage.

Accordingly, it is a principal object of the invention to provide a solar seeker that automatically or manually tracks the sun for a maximum daily intake of soar energy to supply a predetermined amount of direct current electricity for various applications.

It is another object of the invention to provide a solar seeker that can rotate solar panels 680 degrees about a vertical axis and raise panels from horizontal to 45 degrees above the horizontal.

It is a further object of the invention to provide a solar seeker that eliminates or greatly reduces the need for petroleum driven generators.

It is an object of the invention to provide improved elements and arrangements thereof in a solar seeker for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
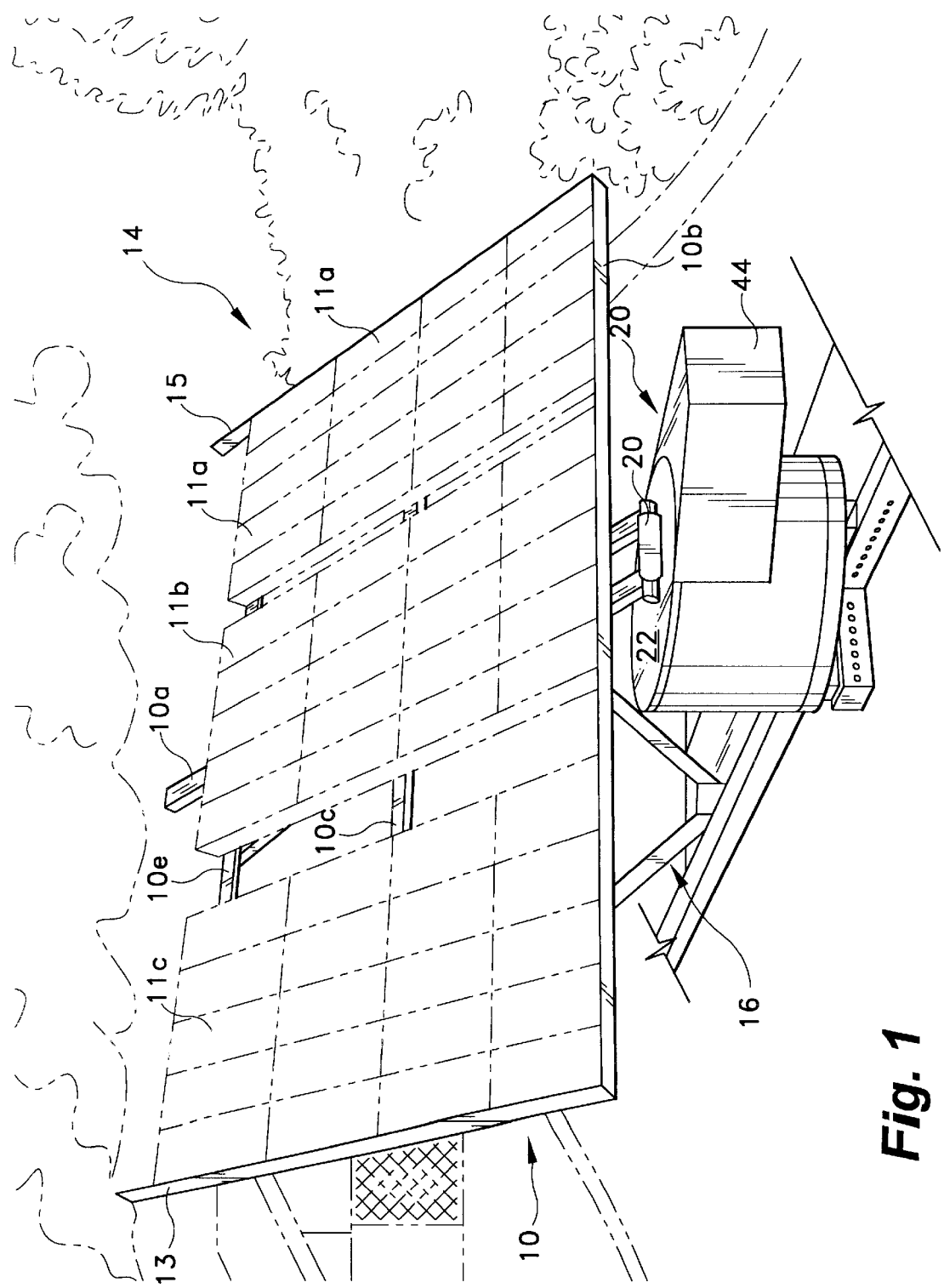
FIG. 1 is an environmental front, perspective view of a solar seeker according to the present invention.

The present invention is directed to a solar seeker that automatically or manually tracks the sun for a maximum daily intake of solar energy to supply predetermined amount of direct current electricity for various applications. The invention disclosed herein is, of course, susceptible of embodiment in many different forms. Shown in the drawings FIGS. 1–13 and described hereinbelow in detail is a preferred embodiment 14 of the invention. It is to be understood, however, that the present disclosure is an exemplification of the principles of the invention and does not limit the invention to the illustrated embodiment 14.

Figure 2:
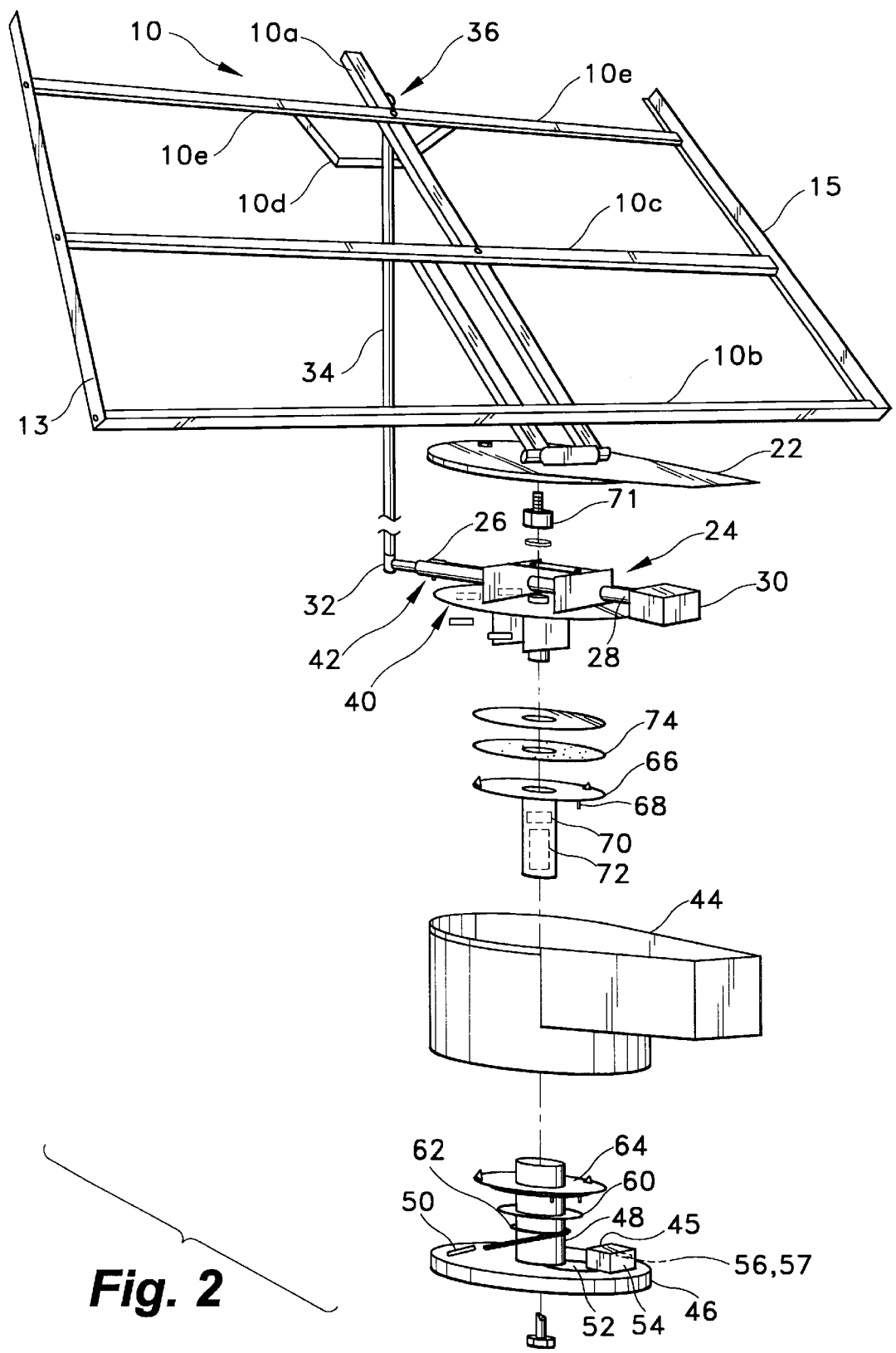
FIG. 2 is an exploded view of the solar seeker shown in FIG. 1.
Figure 3:
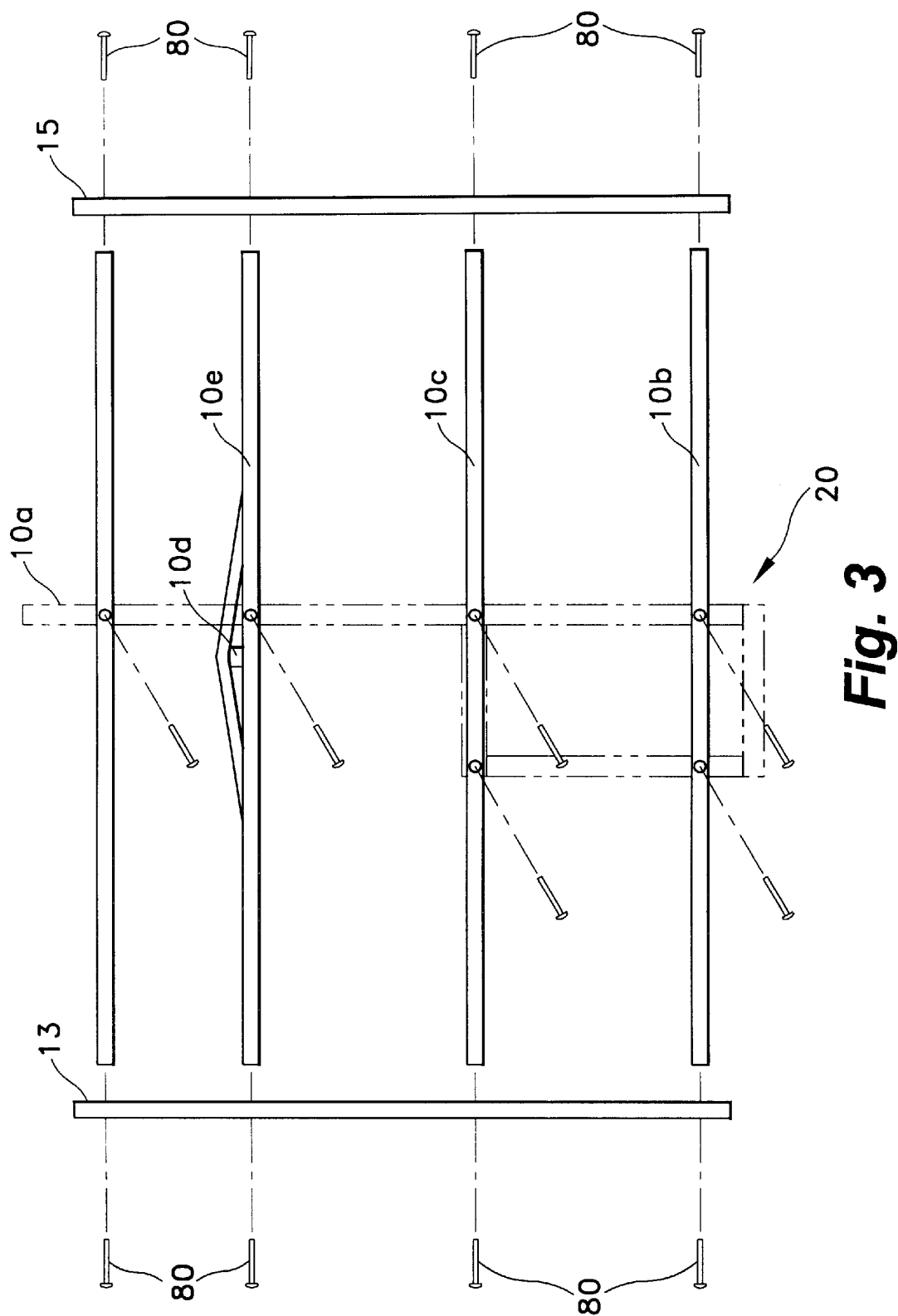
FIG. 3 is an exploded front view of a solar panel carriage according to the invention.
Figure 4:
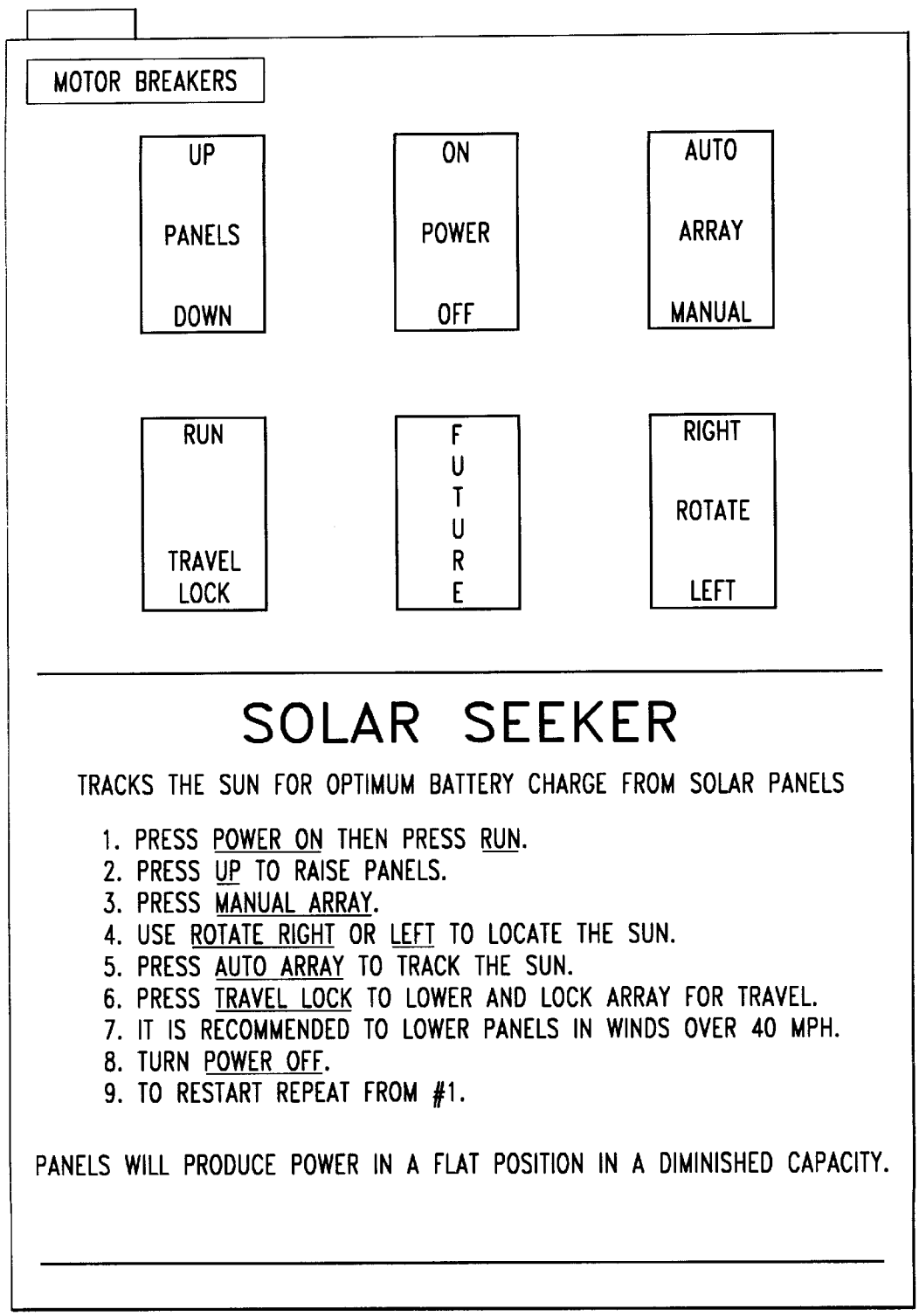
FIG. 4 is a front view of a solar seeker control panel according to the invention.

The solar seeker 14 includes a solar panel carriage assembly 10, a mounting assembly 12, and a travel assembly 16. As shown in FIGS. 1–3, the solar panel carriage assembly 10 includes a solar panel carriage 10*a* with side supports 13, 15 a bottom support 10*b*, a center support 10*c*, a down rest arm 10*d*, and a top support 10*e*. The solar panel carriage 10*a* may be configured for a variety of sized solar panels 11*a*,11*b*,11*c* with a maximum of three panels of approximate size of twenty-six inches by fifty-nine inches. It is important that any combination of panels have a minimum of three inches open space or a maximum of nine inches of open space between panels. Such a solar panel 11*a* typically includes a reflector plate which can be made of stainless steel, chromium plate, or the like but is generally made of a plastic, steel, or wood base, with a reflection surface laminated thereto. The reflection surface includes an energy absorbing surface lamination or equivalent photo electrical panel array for deriving energy from the solar panel. The solar panel carriage mounts on a carriage pivot 20 that is attached to the mounting assembly.

The solar panel carriage 10a is mounted on a carriage pivot 20 that is attached to a top plate 22 of the mounting assembly 12. The mounting assembly 12 includes the top plate 22 which functions as a weather guard for the entire solar seeker 14. The top plate 22 has a top cover ring 24 welded to it's underside to which side covers are secured. The top plate 22 is bolted to a ram screw assembly 24 which is a box configuration within which are included a ram screw 26, an up limit switch, a down limit switch, a lift limit rod 28, and a reversible lift motor 30. Both limit switches are triggered by the lift limit rod 28. At the end of the ram screw 26 a U joint 32 is attached, and attached to the U joint 32 by a long coupling is a lift rod 34, and the end is a top pivot connector 36 that attaches to the solar panel carriage 10a. In the base of the ram screw assembly is a rotate motor mount 40 and a low panel protection switch 42 that is controlled by the lift limit rod 28.

The mounting assembly 12 includes a generally circular base plate 44 which may be mounted on any surface but must be level for normal operation, and must be level when travelling. Mounted on the base plate 44 is a bottom weather ring 46, a main post 48, a buss bar 50, a first timing plate 52, travel switches, and a reversible rotation motor box 54. On the reversible rotation motor box 54 is attached a timing switch trigger 56 and a limit switch trigger 57. The reversible rotation motor box 54 includes contained therein a rotate motor upon which is attached a drive sprocket which is attached by a bicycle type chain to a stationary rotation sprocket. Also on the rotation motor box 54 is mounted the array return limit switch 45 which is triggered by an array return timing plate 60. Attached to the main post 48 is a stationary pivot sprocket 62, the array return timing plate 60 described above, and a second timing plate 64. The array return timing plate 60 turns freely and is positioned directly below the second timing plate 64. Attached to the second timing plate 64 is a first limit trigger switch, a second limit trigger switch, and a ball bearing plate 66. Mounted on top of the second timing plate 64 is a first rotation advance post 68. A second rotation post 70 is inserted within the main post 48 with a shim (not shown). On the interior of the second rotation post 70 is a tension post 72 and internal bearing, (including a tension nut for tension adjustment). A tension post and bearing are greased and placed inside the second rotation post and the tension nut (internal) is screwed down on the main bolt 71 and tension is adjusted. A dust gasket is placed on a third timing plate 74 and the first rotation post 68 is inserted with a shim into the second rotation post 70. A bearing is greased and placed over the main bolt and the main bolt tension nut is adjusted. The third timing plate 74 includes attached thereto a first limit switch trigger, a second limit switch trigger, and a ball bearing plate. The bottom of the ram screw assembly 24 includes four rotation limit switches. The solar panel carriage assembly 10 is configured to be shipped as a breakdown unit that can be sized for any solar panel 11a, and can be bolted together and bolted to nuts 80 that are welded in place to the solar panel carriage assembly 10.

The travel carriage 16 is a V-shaped support that is attached in the appropriate place to the main mounting stem that hosts the down rest arm 10d that is attached to the solar panel carriage 10a.

Figure 5:
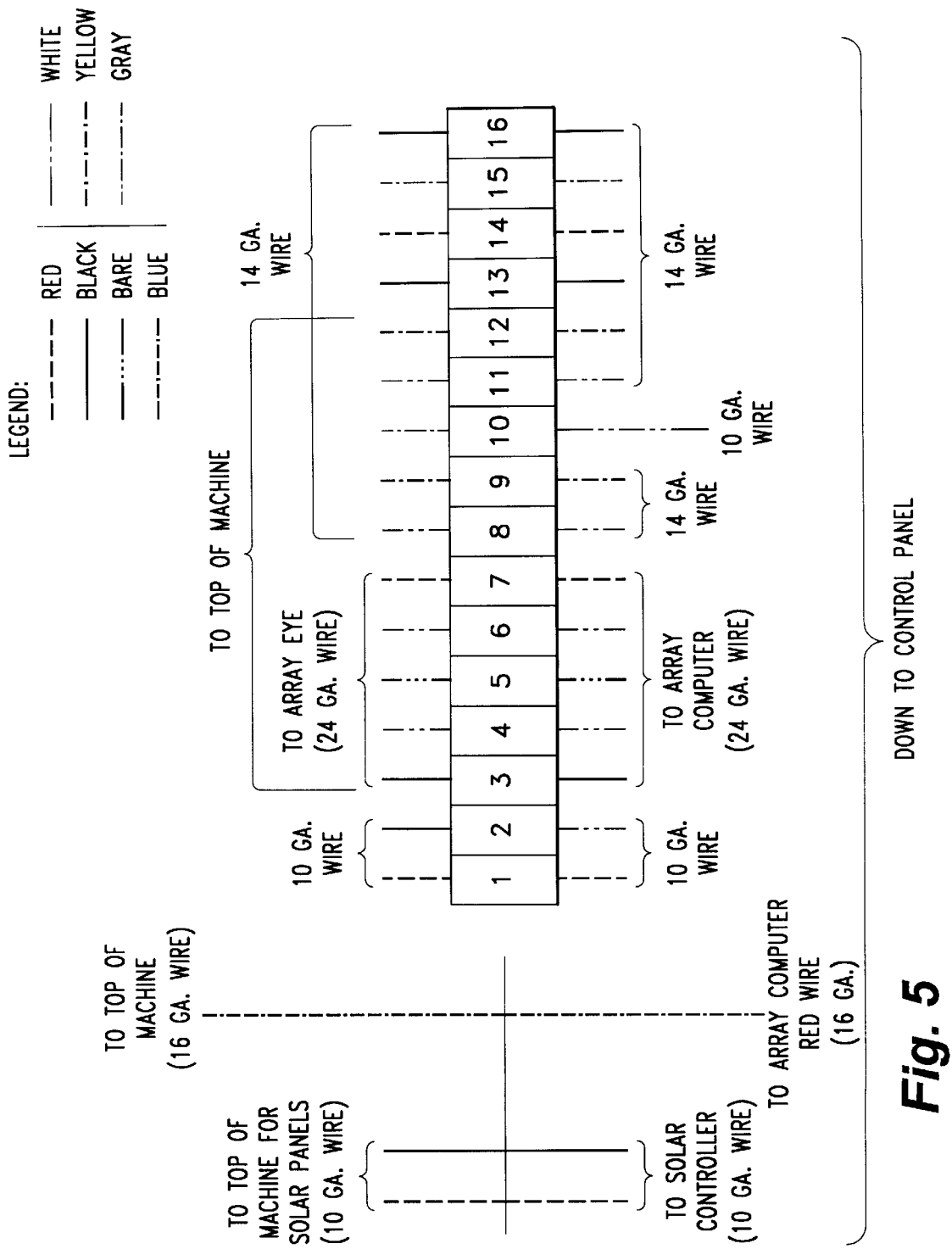
FIG. 5 is a bus wiring diagram according to the invention.
Figure 6:
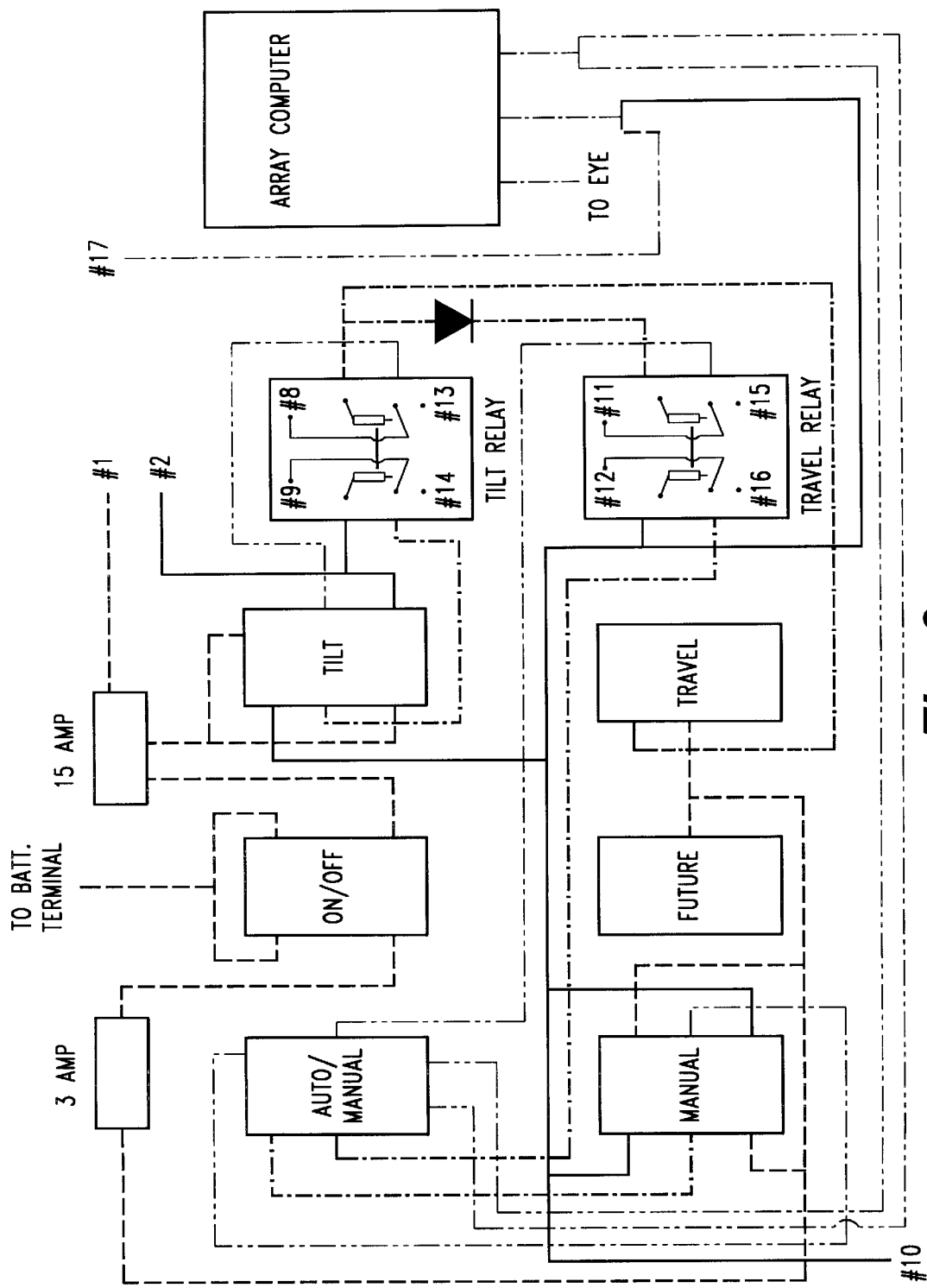
FIG. 6 is a control panel wiring diagram according to the invention.
Figure 7:
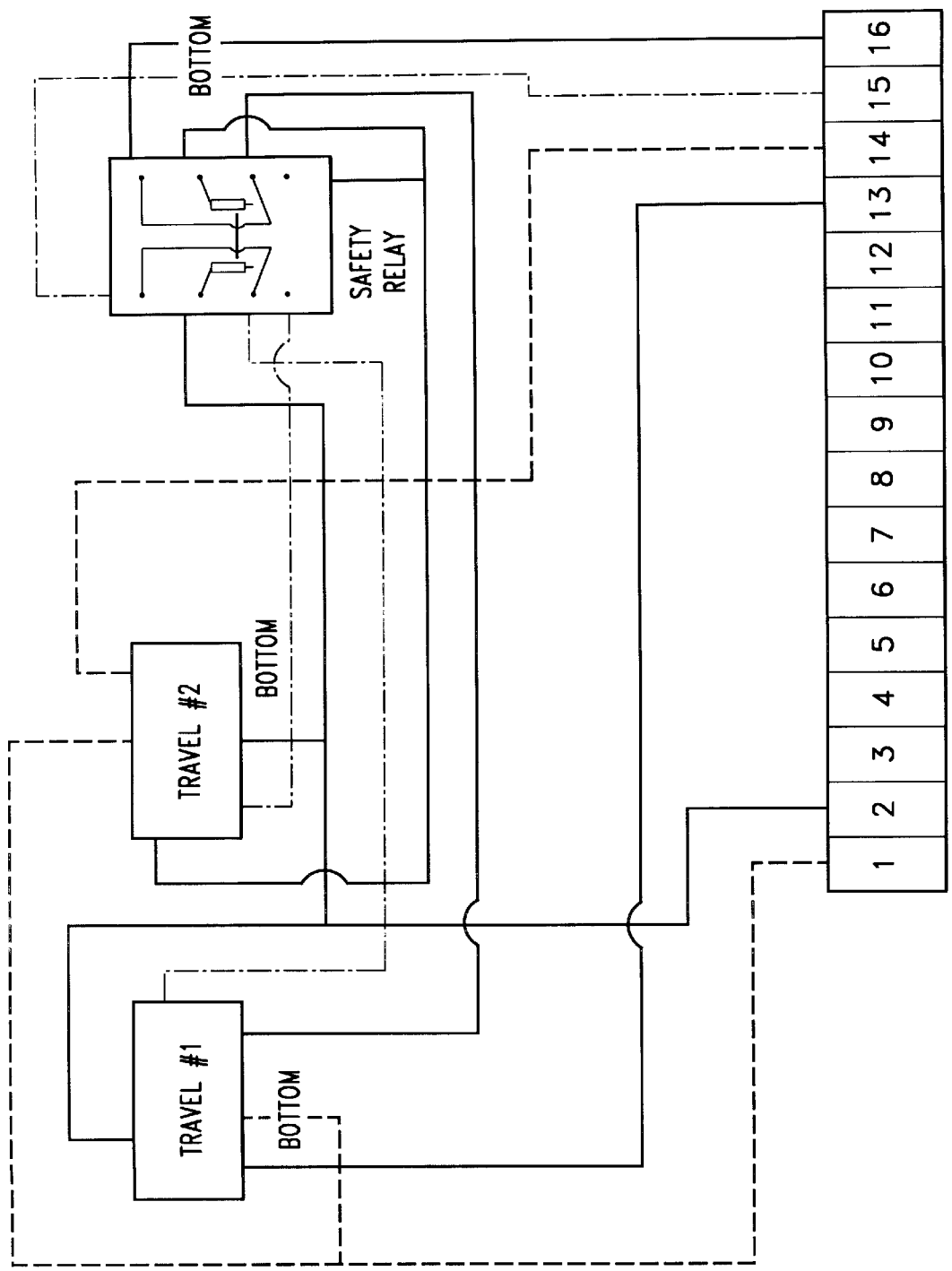
FIG. 7 is a travel position wiring diagram according to the invention.
Figure 8:
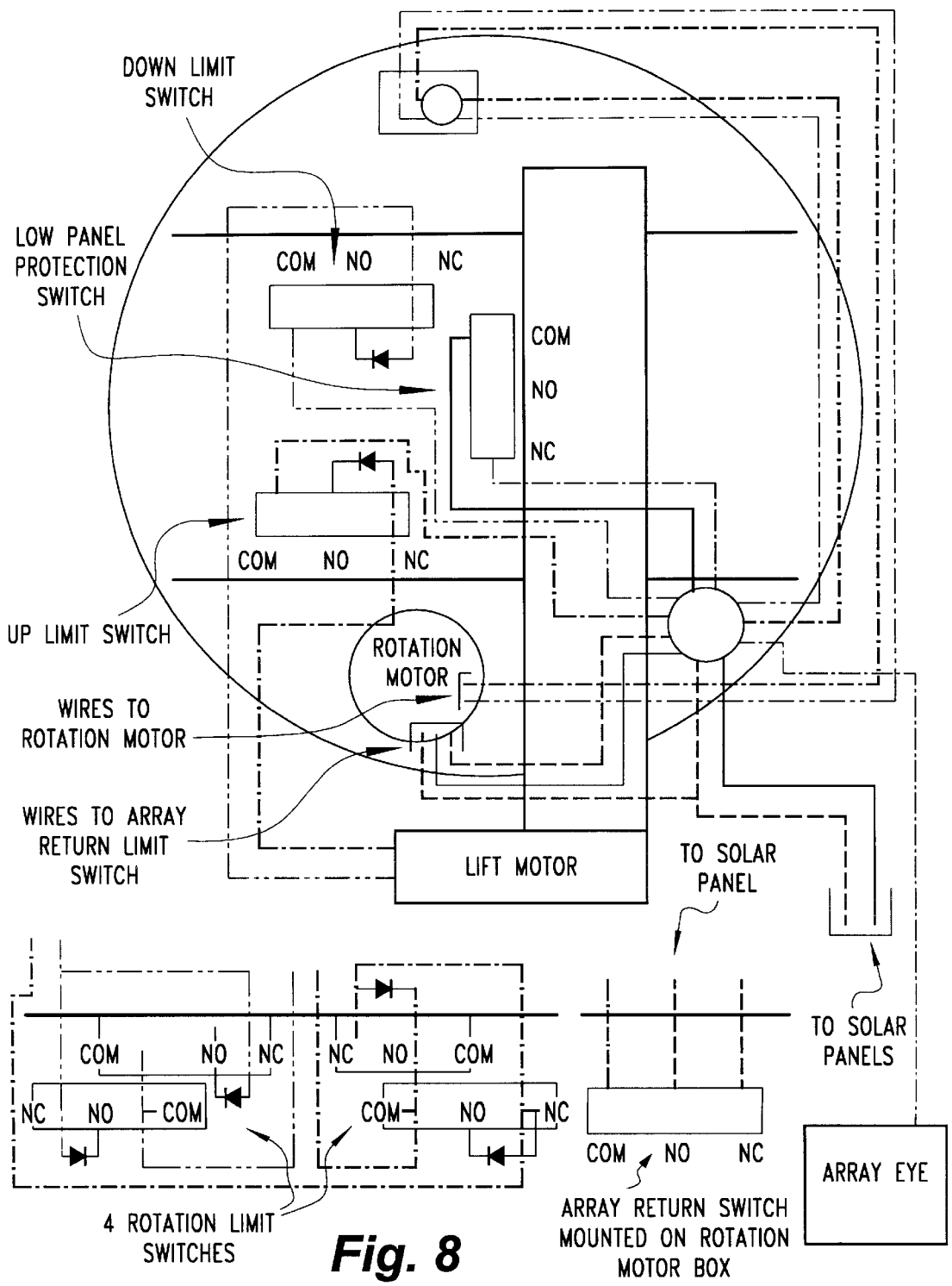
FIG. 8 is a ram screw assembly wiring diagram according to the invention.

Referring now to FIGS. 4–8, FIG. 4 shows a front view of the solar seeker control panel. The controls include a power on/off switch, a run/travel lock switch, a panel up/down switch, an array switch for auto or manual operation, and for use in manual mode, a rotate right/left switch. FIG. 5 shows the bus wiring diagram. FIG. 6 shows the control panel wiring diagram. FIG. 7 shows the travel position wiring diagram. FIG. 8 shows the ram screw assembly wiring diagram.

Figure 9A:
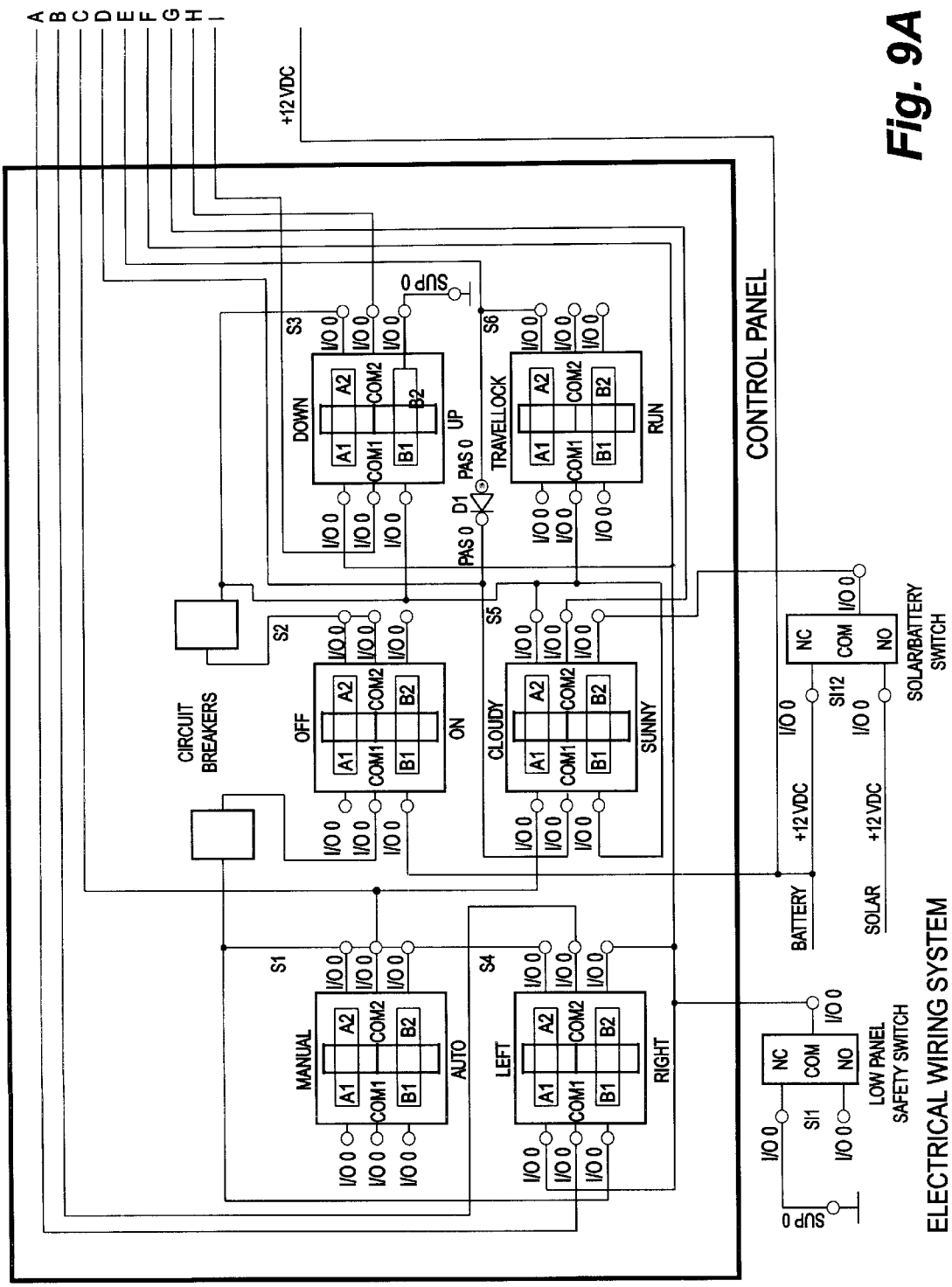
FIG. 9A is a weather sensing wire diagram for controlling the solar seeker according to the invention.

FIG. 9A is a weather sensing wire diagram for controlling the solar seeker according to the invention.

Figure 9B:
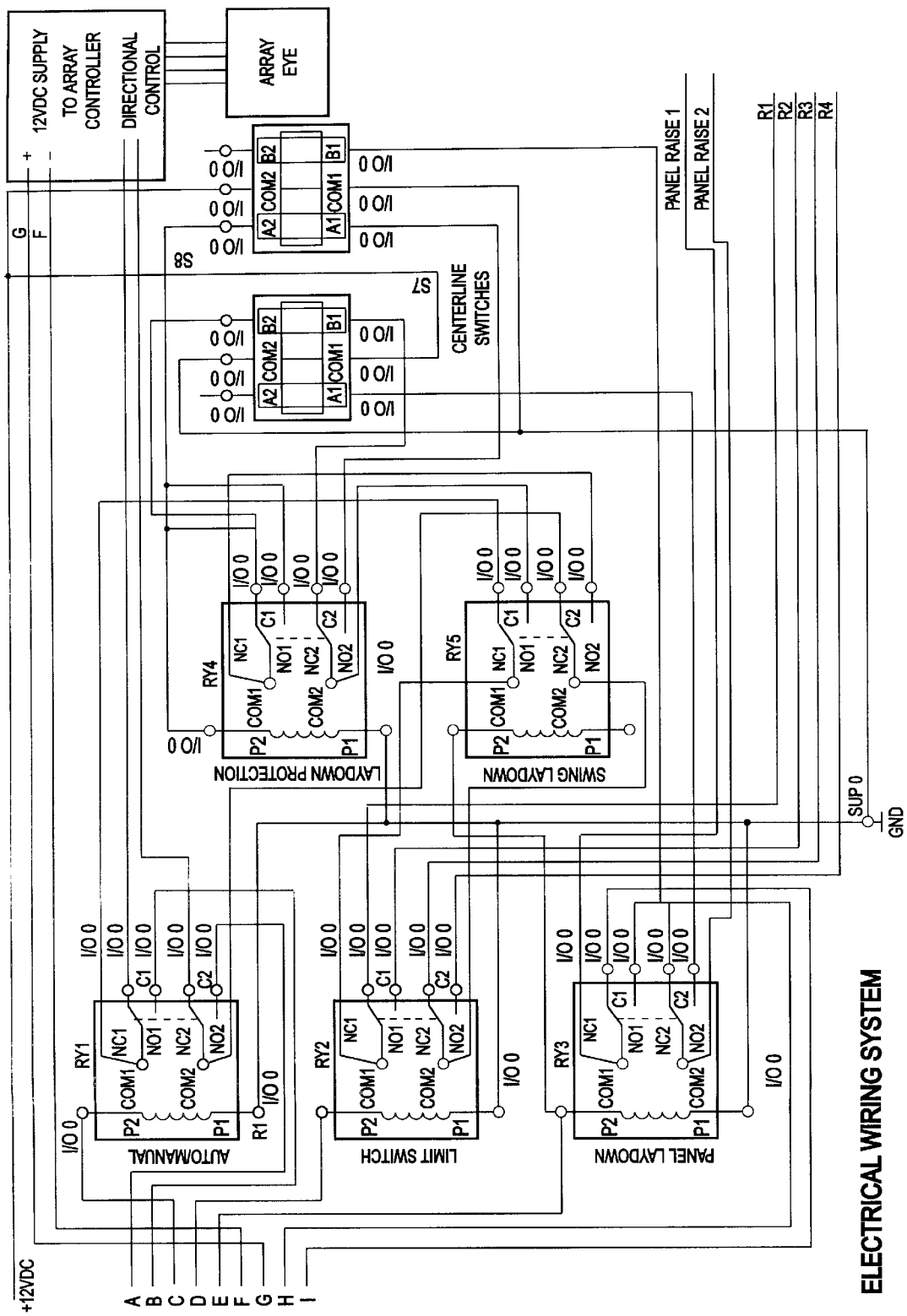
FIG. 9B is a panel control wire diagram for controlling the solar seeker panel according to the invention.

FIG. 9B is a panel control wire diagram for controlling the solar seeker panel according to the invention.

Figure 9C:
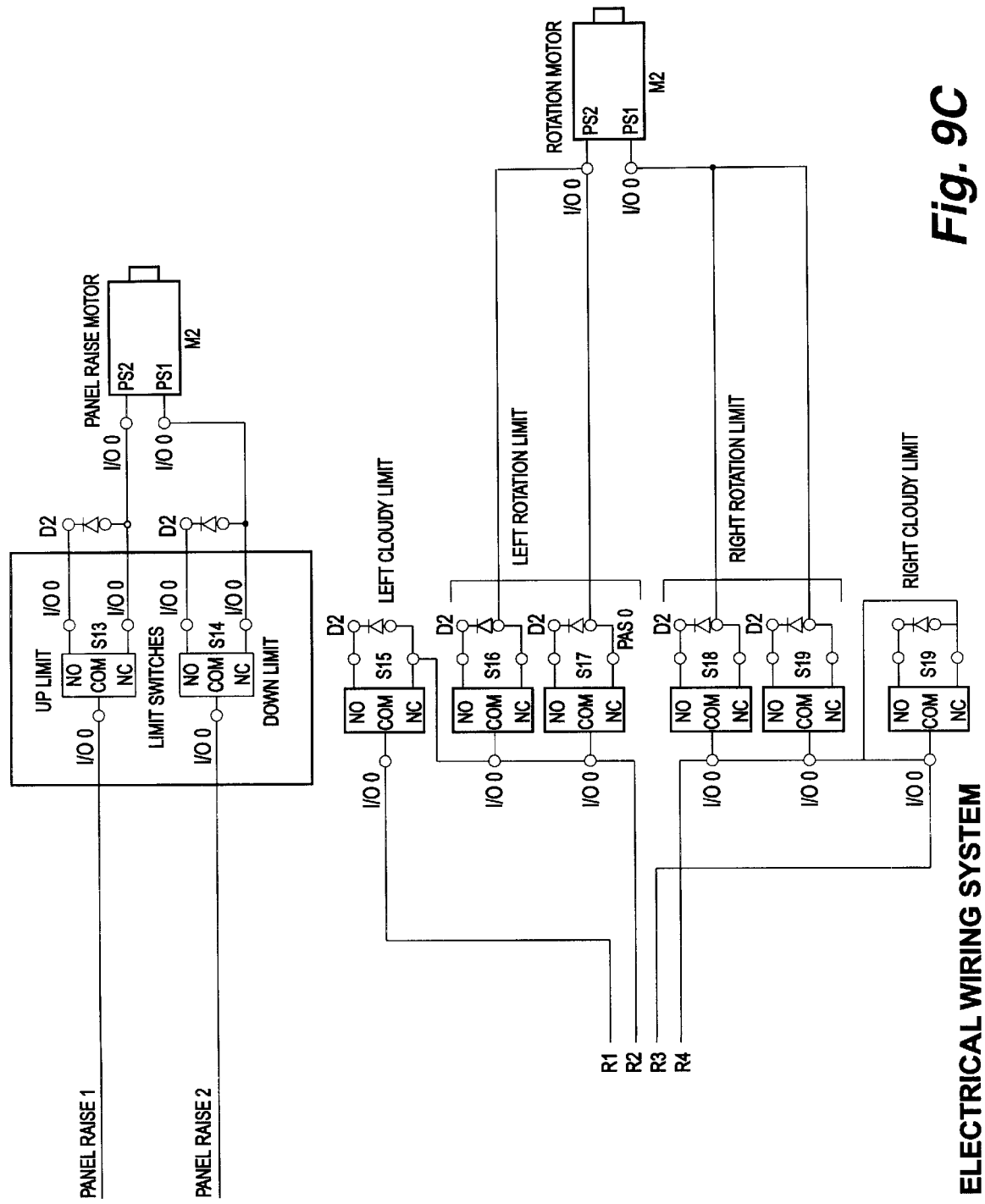
FIG. 9C is a motor control wire diagram for controlling the solar seeker according to the present invention.

FIG. 9C is a motor control wire diagram for controlling the solar seeker according to the present invention.

Figure 10A:
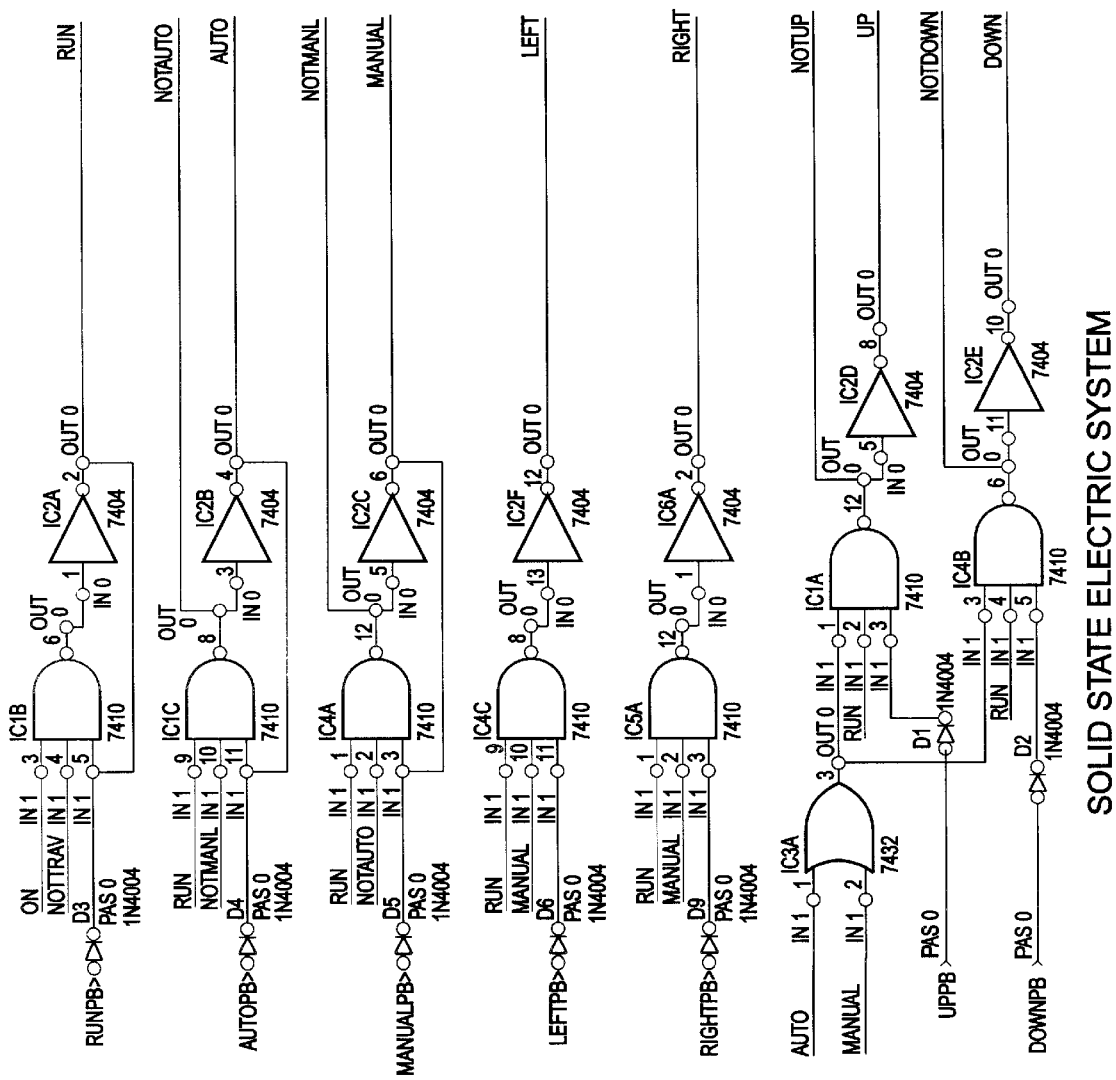
FIG. 10A is a solid state electrical wire diagram for controlling automated features of the solar seeker according to the invention.

FIG. 10A is a solid state electrical wire diagram for controlling automated features of the solar seeker according to the invention.

Figure 10B:
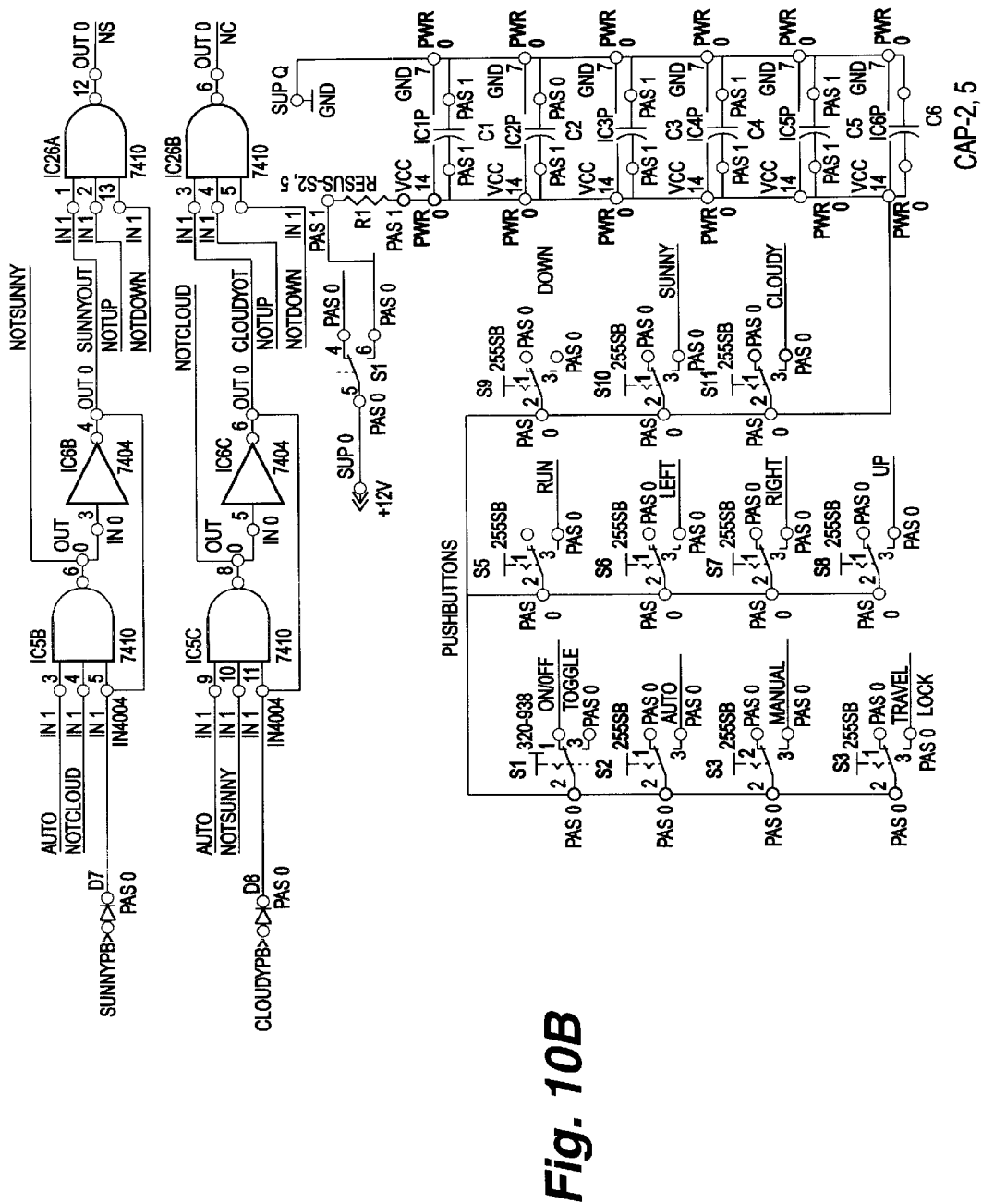
FIG. 10B is a solid state wire diagram of the control panel according to the invention with weather related control features.

FIG. 10B is a solid state wire diagram of the control panel according to the invention with weather related control features.

Figure 11:
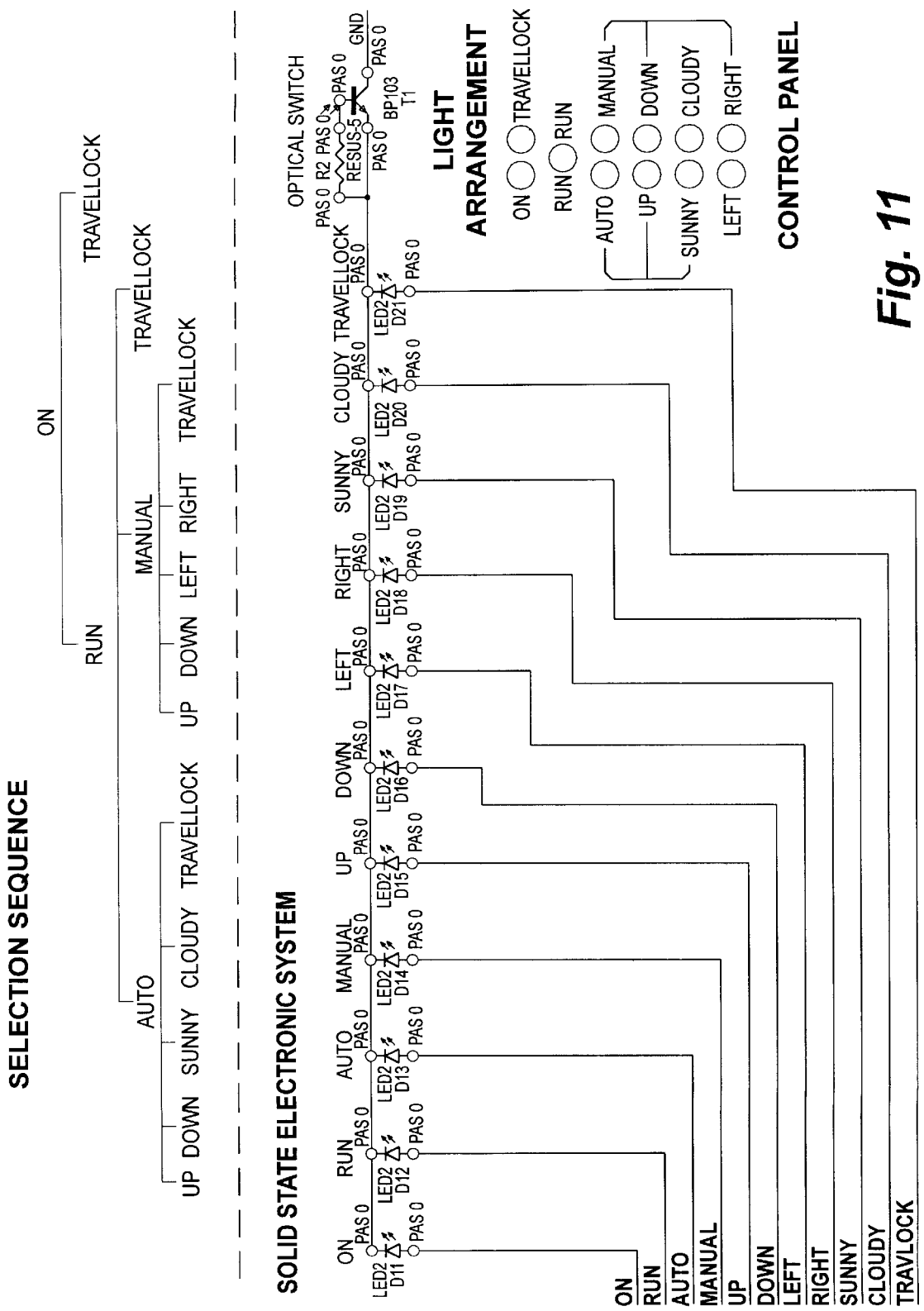
FIG. 11 is a wire diagram of the selection sequence govern by FIGS. 10A and 10B for controling the solar seeker according to the invention.

FIG. 11 is a wire diagram of the selection sequence govern by FIGS. 10A and 10B for controling the solar seeker according to the invention.

Figure 12A:
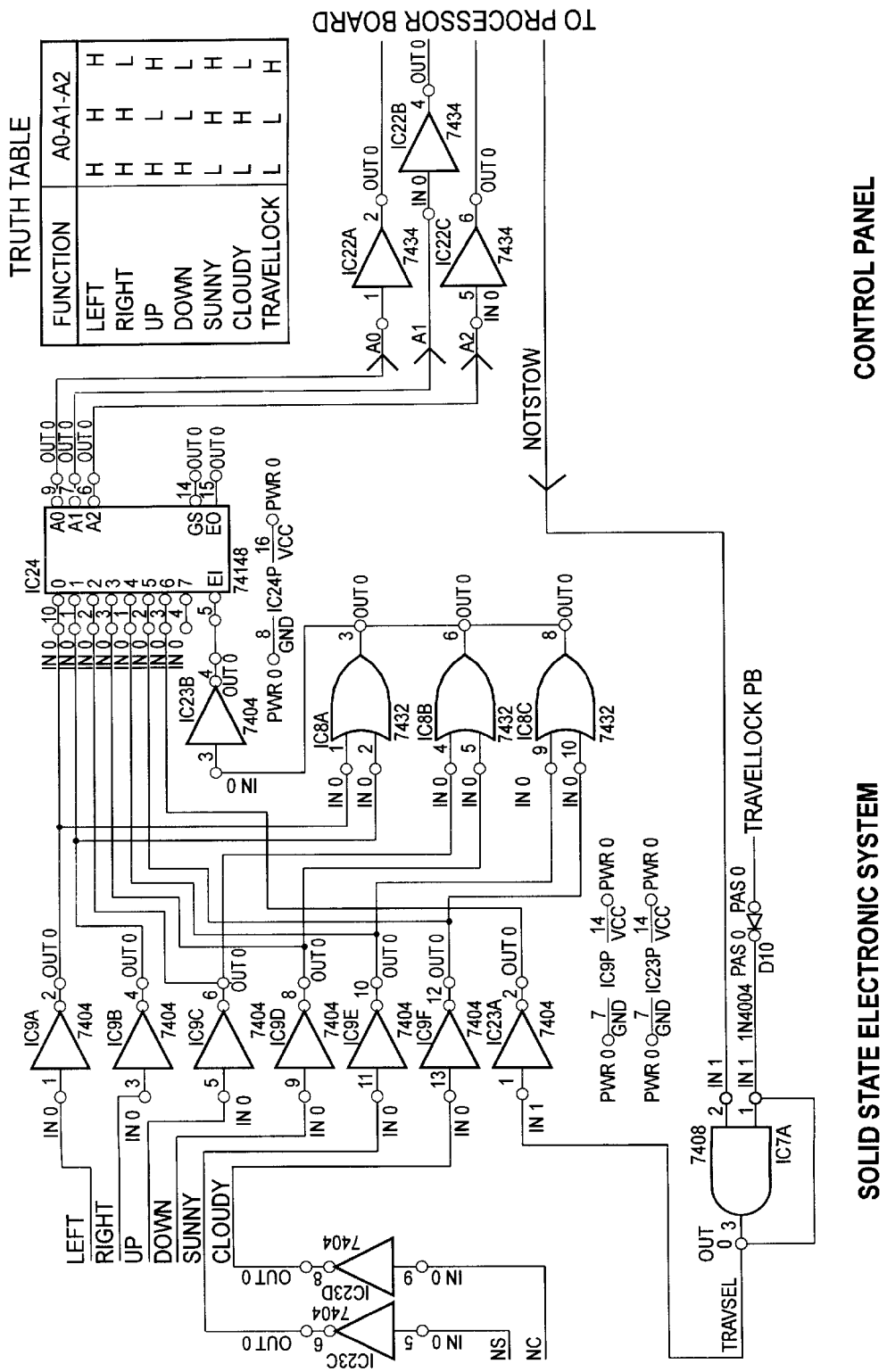
FIG. 12A is a first modular unit of a solid state wire diagram for controlling conditional output from FIG. 10B.

FIG. 12A is a first modular unit of a solid state wire diagram for controlling conditional output from FIG. 10B.

Figure 12B:
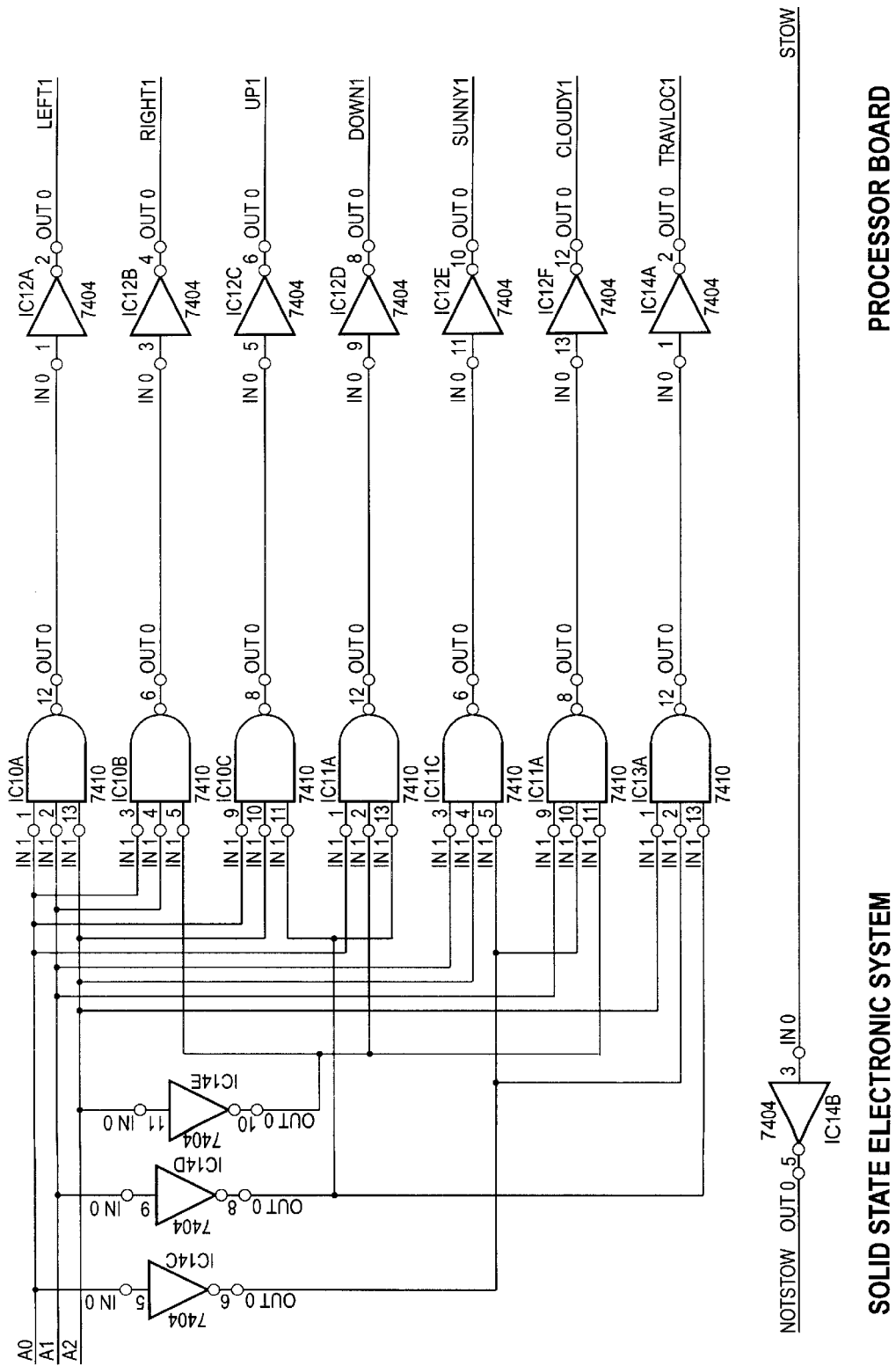
FIG. 12B is a second modular unit of a solid state wire diagram for controlling conditional output from FIG. 12A.

FIG. 12B is a second modular unit of a solid state wire diagram for controlling conditional output from FIG. 12A.

Figure 12C:
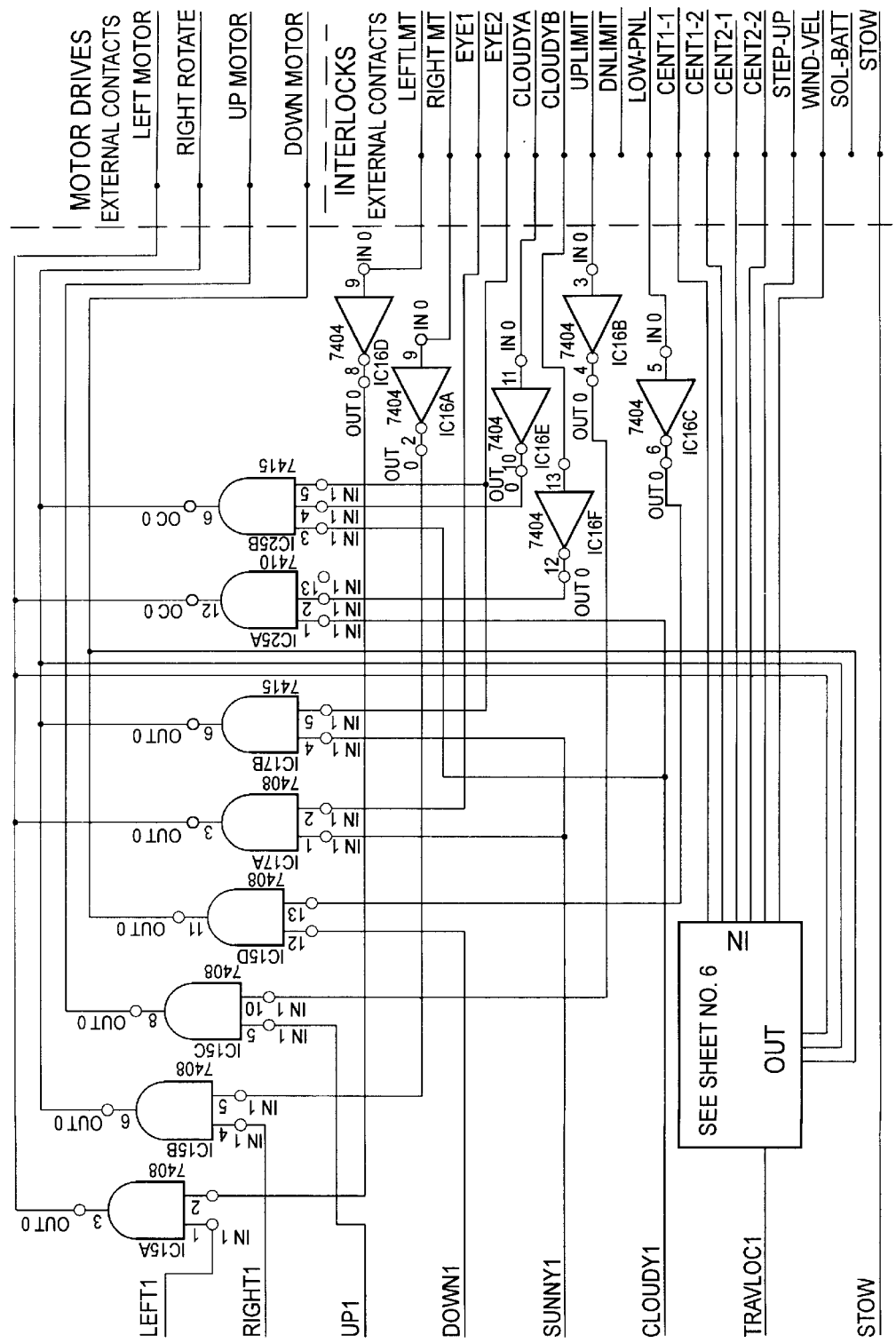
FIG. 12C is a third modular unit of a solid state wire diagram for controlling external motor drives and interlocks via conditional output from FIG. 12B.

FIG. 12C is a third modular unit of a solid state wire diagram for controlling external motor drives and interlocks via conditional output from FIG. 12B.

Figure 13:
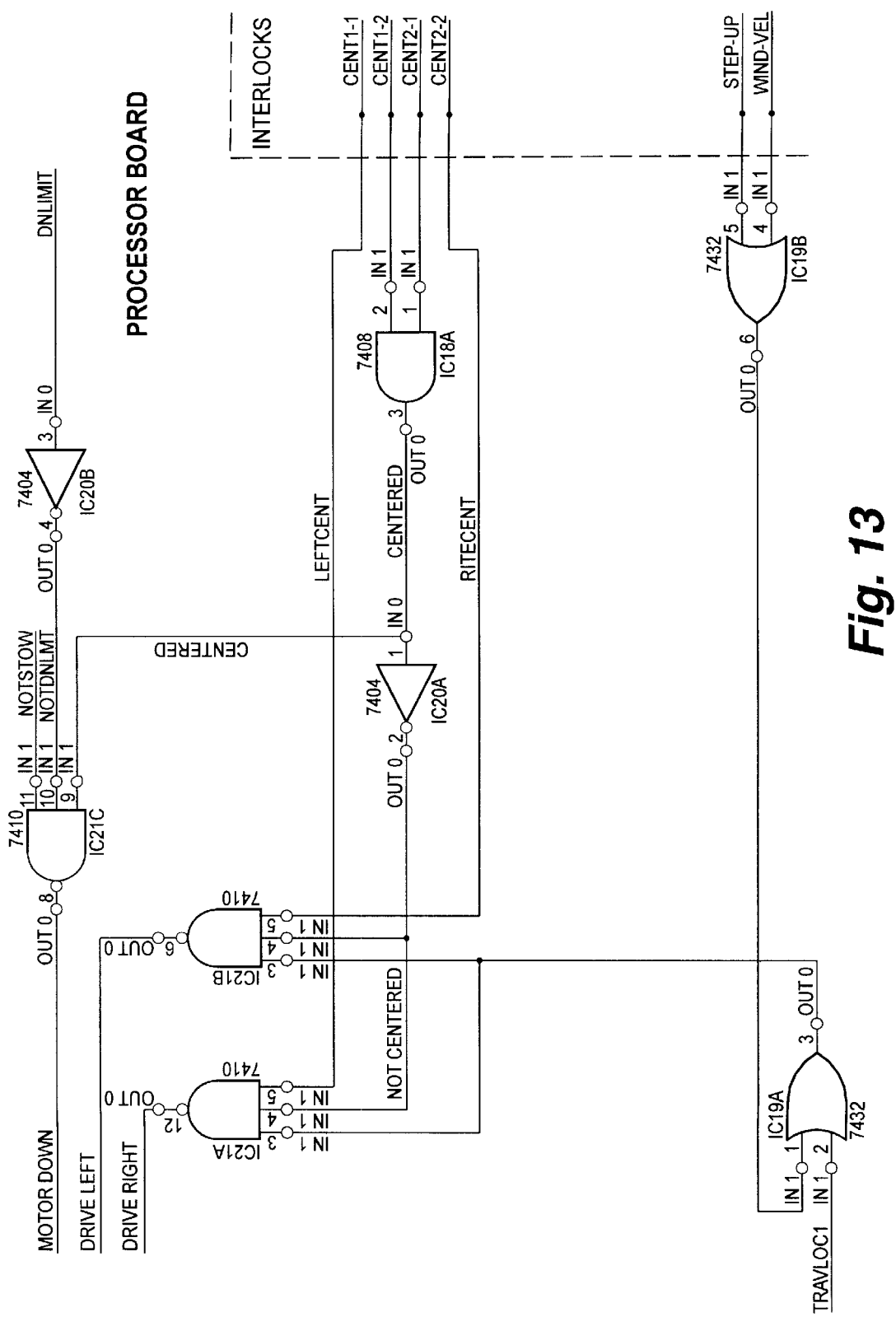
FIG. 13 is a fourth modular unit of a solid state wire diagram for controlling external motor drives and interlocks via conditional output from FIG. 12C.

FIG. 13 is a fourth modular unit of a solid state wire diagram for controlling external motor drives and interlocks via conditional output from FIG. 12C.

The solar seeker unit has a capability to rotate an array panel in 680 degrees. It has the overall ability to lift panels from a flat position to an upright 45 degree position.

It is to be understood that the present invention is not limited to the sole embodiment described above, but encompasses any and all embodiments within the scope of the following claims.

We claim:
1. A solar seeker comprising:
   a solar panel carriage assembly;
   a mounting assembly attached to said carriage assembly, said mounting assembly including:
   a top plate attached to said solar panel carriage, said, top plate having a top cover ring welded thereto;
   a ram screw assembly bolted to said top plate, said ram screw assembly having a box configuration and including a ram screw, an up limit switch, a down limit switch, a lift limit rod, and a reversible lift motor;
   a generally circular base plate housing attached to said top plate and having a bottom weather ring, said housing including;
      a buss bar;
      a first timing plate;
      a plurality of travel switches; and,
      a reversible rotation box;
   a main post extending upwardly from said weather ring and including;
      a stationary pivot sprocket;
      an array return timing plate;
      a second timing plate including;
         a first limit trigger switch;
         a second limit trigger switch;

a ball bearing plate; and
a first rotation advance post;
a first rotation advance post;
a second rotation post inserted within said main post and having a tension post, a bearing, and a tension nut for tension adjustment;
a third timing plate located above said second timing plate and having attached thereto a first limit switch trigger, a second limit switch trigger, and a ball bearing plate; and a travel assembly for supporting said carriage assembly as it moves.

2. The solar seeker according to claim 1, wherein said solar panel carriage assembly includes:

a solar panel carriage with side supports, a bottom support, a center support, a down rest arm for attachment to said travel assembly, a top support, and a carriage pivot attached to the mounting assembly.

\* \* \* \* \*